(12) United States Patent  
Matsumoto et al.

(10) Patent No.: US 11,807,324 B2  
(45) Date of Patent: Nov. 7, 2023

(54) TARGET INSTALLATION APPARATUS

(71) Applicant: HONDA MOTOR CO., LTD., Tokyo (JP)

(72) Inventors: Kazuki Matsumoto, Tokyo (JP); Kenta Miyazawa, Tokyo (JP); Akiko Tsuruya, Tokyo (JP); Mako Seki, Tokyo (JP); Naoki Kawahara, Tokyo (JP); Masaharu Miyoshi, Tokyo (JP); Eiji Omori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/939,608

(22) Filed: Sep. 7, 2022

(65) Prior Publication Data

US 2023/0001996 A1     Jan. 5, 2023

Related U.S. Application Data

(63) Continuation of application No. PCT/JP2021/003699, filed on Feb. 2, 2021.

(30) Foreign Application Priority Data

Mar. 11, 2020    (JP) ................................ 2020-042124

(51) Int. Cl.  
    *G01B 5/14*      (2006.01)  
    *B62D 5/16*      (2006.01)

(52) U.S. Cl.  
    CPC .................................. *B62D 5/16* (2013.01); *G01B 5/14* (2013.01)

(58) Field of Classification Search  
CPC ......... B62D 65/16; G01B 5/14; G01M 11/067  
See application file for complete search history.

(56) References Cited

U.S. PATENT DOCUMENTS

| 4,569,140 A | 2/1986 | Hobson |
| 4,573,273 A | 3/1986 | Eck |
| 5,675,515 A * | 10/1997 | January ................ G01B 11/275 356/139.09 |

(Continued)

FOREIGN PATENT DOCUMENTS

| JP | 2019-7953 A | 1/2019 |
| JP | 2019-51786 A | 4/2019 |

OTHER PUBLICATIONS

International Search Report dated Apr. 27, 2021, issued in counterpart International Application No. PCT/ JP2021/003699, with English Translation. (5 pages).

*Primary Examiner* — Yaritza Guadalupe-McCall  
(74) *Attorney, Agent, or Firm* — WHDA, LLP

(57) ABSTRACT

There is provided a target installation apparatus. A rod-shaped member is capable of being arranged to extend in a vehicle width direction of the vehicle ahead of or behind the vehicle, and is provided with a target point indicating an installation position of the target. A reference member is formed such that reference points are positioned on left and right outer sides in the vehicle width direction of the vehicle when the reference member is arranged with respect to the vehicle. A connection unit connects the rod-shaped member and the reference member such that a distance from the reference point to the target point in the front-and-rear direction satisfies a predetermined condition.

10 Claims, 7 Drawing Sheets

(56) References Cited

U.S. PATENT DOCUMENTS

| | | | | |
|---|---|---|---|---|
| 5,809,658 | A | * | 9/1998 | Jackson ............ G01B 11/2755 33/203.18 |
| 7,089,776 | B2 | * | 8/2006 | Dale, Jr. ............. G01B 11/275 33/203.18 |
| 7,538,864 | B2 | * | 5/2009 | Golab ................ G01C 11/025 356/139.09 |
| 9,778,030 | B2 | * | 10/2017 | McClenahan ...... G01B 11/2755 |
| 11,243,074 | B2 | * | 2/2022 | DeBoer ............... G01B 11/275 |
| 2014/0259707 | A1 | | 9/2014 | Jones et al. |
| 2022/0228860 | A1 | * | 7/2022 | Ohmori .................. G01S 7/403 |
| 2023/0001996 | A1 | * | 1/2023 | Matsumoto ........... B62D 65/16 |
| 2023/0243676 | A1 | * | 8/2023 | Lawrence ............ H04N 17/002 73/1.01 |

* cited by examiner

F I G. 8A
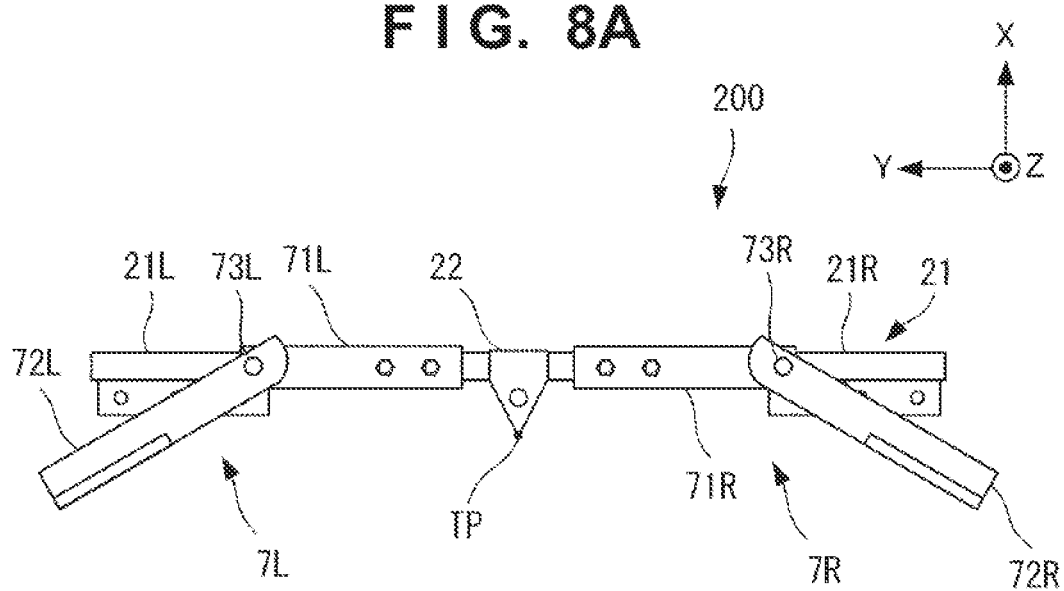
F I G. 8B
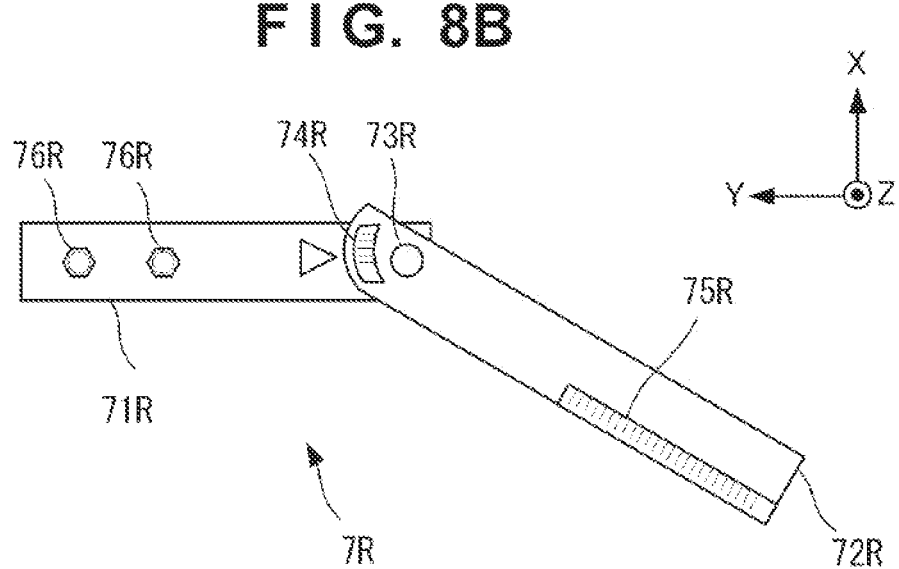

TARGET INSTALLATION APPARATUS

CROSS-REFERENCE TO RELATED APPLICATION(S)

This application is a continuation of International Patent Application No. PCT/JP2021/003699 filed on Feb. 2, 2021, which claims priority to and the benefit of Japanese Patent Application No. 2020-042124 filed on Mar. 11, 2020, the entire disclosures of which are incorporated herein by reference.

BACKGROUND OF THE INVENTION

Field of the Invention

The present invention relates to a target installation apparatus for installing an aiming target of equipment mounted on a vehicle.

Description of the Related Art

In order to adjust equipment such as light and external sensors mounted on an automobile, conventionally, a target is installed ahead of or behind the vehicle in some cases. Japanese Patent Laid-Open No. 2019-51786 discloses a method for positioning an aiming target installed ahead of a vehicle.

SUMMARY OF THE INVENTION

According to an embodiment of the present invention, there is provided a target installation apparatus for installing an aiming target of equipment mounted on a vehicle, the apparatus comprising: a rod-shaped member that is configured to be capable of being arranged to extend in a vehicle width direction of the vehicle ahead of or behind the vehicle, and is provided with a target point indicating an installation position of the target; and a reference member that is formed such that reference points are positioned on left and right outer sides in the vehicle width direction of the vehicle when the reference member is arranged with respect to the vehicle; and a connection unit that connects the rod-shaped member and the reference member such that a distance from the reference point to the target point in the front-and-rear direction satisfies a predetermined condition, wherein the connection unit includes a set of first connection members that connect the rod-shaped member and the reference member on left and right outer sides of the vehicle when the reference member is arranged with respect to the vehicle, and a set of second connection members that extend from the left and right outer sides of the vehicle toward a center in the vehicle width direction to connect the rod-shaped member and the reference member when the reference member is arranged with respect to the vehicle.

Further features of the present invention will become apparent from the following description of exemplary embodiments (with reference to the attached drawings).

BRIEF DESCRIPTION OF THE DRAWINGS

FIG. 8A is a plan view showing a configuration example of a front bar member according to a third embodiment.

FIG. 8B is a plan view showing a configuration example of an extension member according to the third embodiment.

DESCRIPTION OF THE EMBODIMENTS

Figure 1:
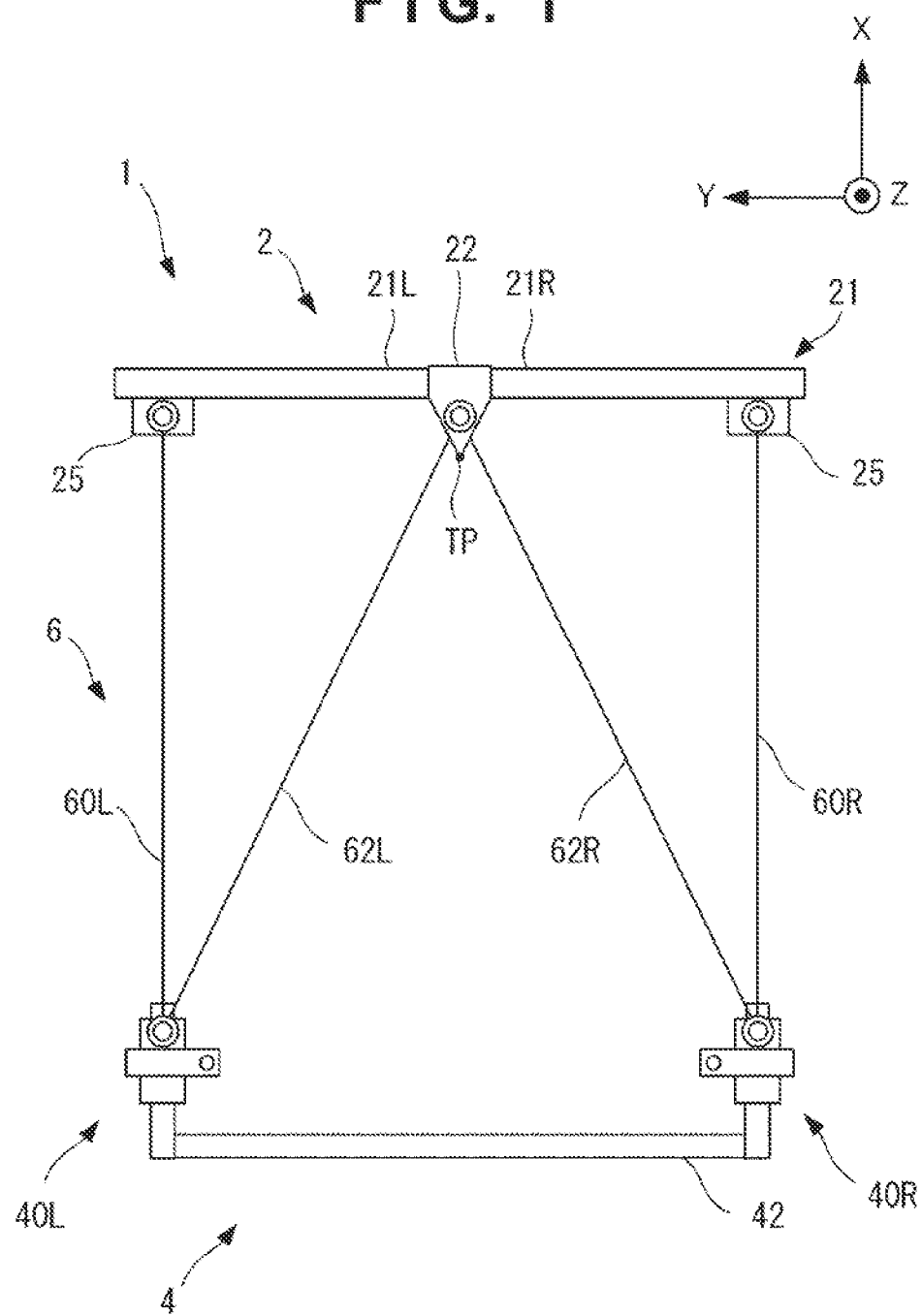
FIG. 1 is a plan view schematically illustrating a target installation apparatus according to a first embodiment.

Regarding the installation of such a target, further improvement is desired from the viewpoint of accuracy of the installation position, work efficiency, and the like.

An object of the present invention is to provide a technique for improving workability at the time of installing an aiming target.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In addition, in each drawing, an X direction indicates a front-and-rear direction of a vehicle V, a Y direction indicates a vehicle width direction of the vehicle V, and a Z direction indicates a vertical direction. In addition, in the present specification, expressions such as front/rear, left/right (lateral), upper/lower, and the like indicate a relative positional relationship with respect to the vehicle body, and for example, expressions such as front, forward, and the like correspond to the +X direction and expressions such as rear, rearward, and the like correspond to the −X direction. In addition, for example, expressions such as left, leftward, and the like correspond to the +Y direction, and expressions such as right, rightward, and the like correspond to the −Y direction. Similarly, expressions such as the inside of the vehicle body, the outside of the vehicle body (inside and outside of the vehicle), and the like indicate a relative positional relationship with respect to the vehicle body.

First Embodiment

<Overview of Target Installation Apparatus>

Figure 2:
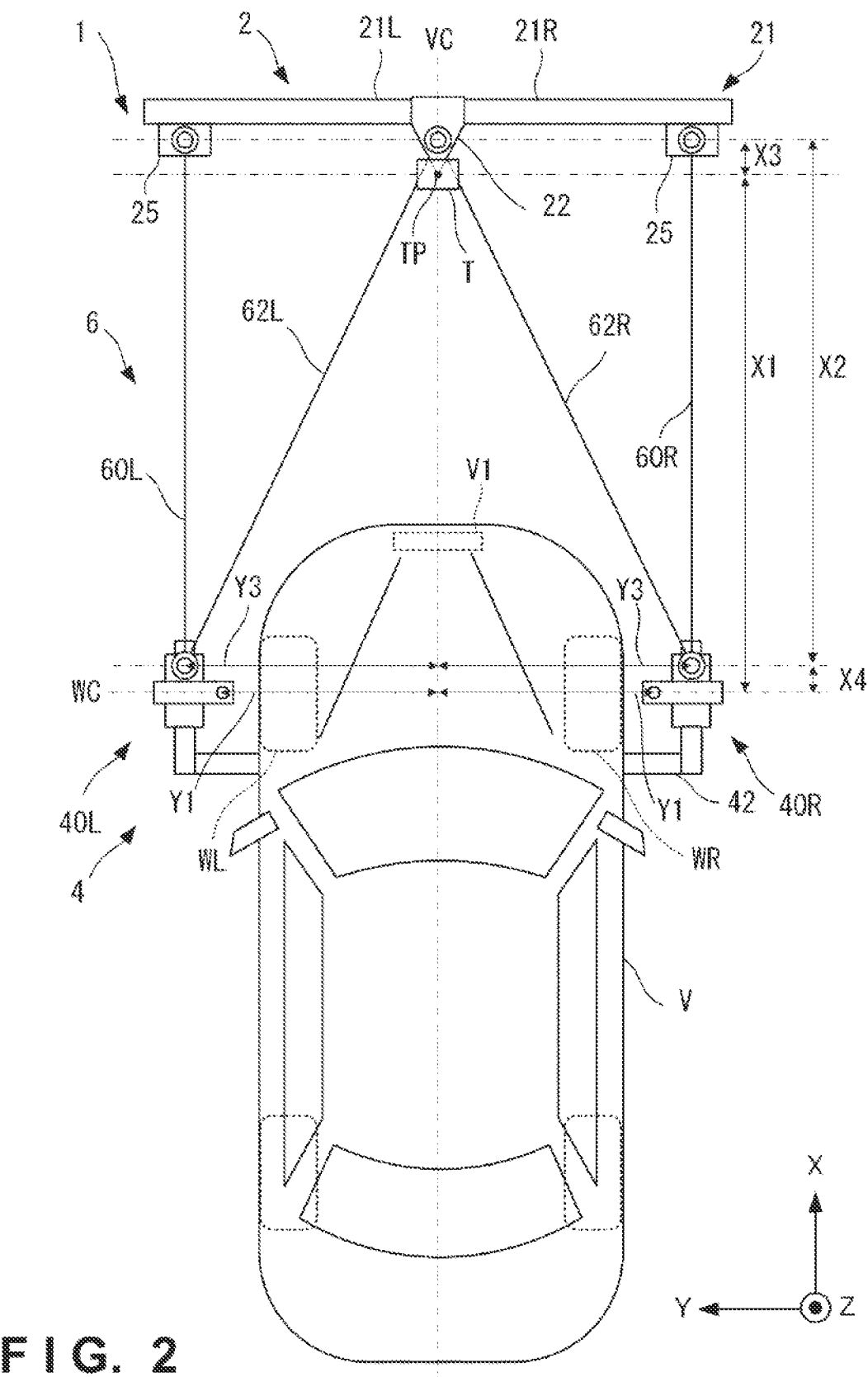
FIG. 2 is a diagram illustrating a state in which the target installation apparatus and a target of FIG. 1 are arranged with respect to a vehicle.

FIG. 1 is a plan view schematically illustrating a target installation apparatus 1 according to a first embodiment. FIG. 2 is a diagram illustrating a state in which the target installation apparatus 1 and a target T in FIG. 1 are arranged with respect to a vehicle V. The target installation apparatus 1 is an apparatus for installing the target T at a predetermined position in order to adjust equipment such as light and external sensors mounted on the vehicle V. Hereinafter, an example of a case where the aiming target T of a radar V1 is installed as an external sensor mounted at a front part of the vehicle V will be described. However, the target installation can also be used for adjustments of other external sensors such as a camera, a LiDAR, and the like, and can also be used for adjustment of equipment in a rear part of the vehicle V by being arranged behind the vehicle V.

The target installation apparatus 1 includes a front bar member 2, a reference member 4, and a connection unit 6. The front bar member 2 and the reference member 4 each extend in the vehicle width direction, are provided apart from each other in the front-and-rear direction, and are connected with each other by the connection unit 6. Then, by aligning reference points 400L and 400R formed on the reference member 4 with predetermined positions of the vehicle V, a target point TP formed on the front bar member 2 is aligned with a position that satisfies a predetermined condition for adjusting the equipment.

The predetermined condition can be set as appropriate. However, for example, the target point TP may be located on an extension line of a center line VC of the vehicle V, and may have a predetermined distance of 1 meter to 10 meters in the front-and-rear direction from the wheel centers of front wheels. Note that the target point TP may be offset in the width direction from the center line VC of the vehicle V.

<Front Bar Member>

Figure 3:
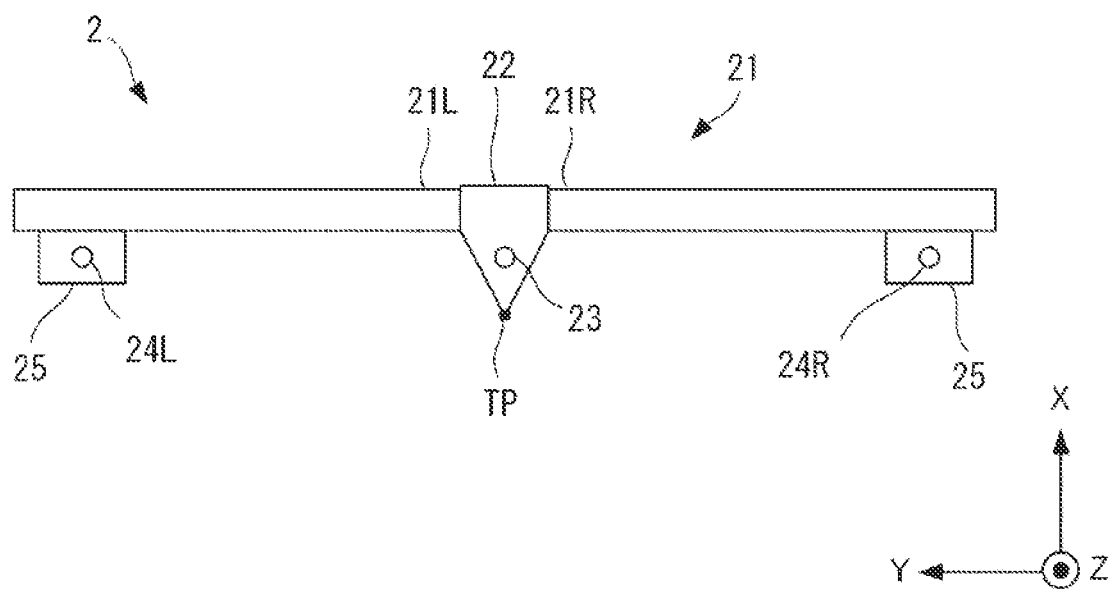
FIG. 3 is a view illustrating a configuration example of a front bar member.

FIG. 3 will also be referred to. FIG. 3 is a diagram illustrating a configuration example of the front bar member 2. The front bar member 2 is a rod-shaped member provided with the target point TP indicating an installation position of the target T. In arranging the front bar member 2 with respect to the vehicle V, it is possible to arrange the front bar member 2 to extend over the vehicle width direction ahead of or behind the vehicle V. The front bar member 2 includes a main body 21, a point forming member 22 that forms the target point TP, and pins 23, 24L, and 24R engageable with a connection member (to be described later) of the connection unit 6.

The main body 21 is a member constituting the framework of the front bar member 2, is made up of, for example, a metal material, and can have a hollow and rectangular cross-sectional shape. In the present embodiment, the main body 21 is divided into left and right parts with the point forming member 22 interposed therebetween, and includes a left-side part 21L and a right-side part 21R. However, the main body 21 may be integrally molded.

The point forming member 22 is a member that defines the position of the target point TP. In the present embodiment, the point forming member 22 is provided to be interposed between the left-side part 21L and the right-side part 21R of the main body 21. As an example, the point forming member 22 may include a convex portion engageable with the hollow part of the main body 21, and may be attached to the main body 21 by engaging therewith. Further, for example, at least one of the left-side part 21L and the right-side part 21R may have a convex-shaped part, and the point forming member 22 may include a recess to be engaged with the convex-shaped part. Further, for example, the point forming member 22 may be provided such that the point forming member 22 sandwiches the main body 21 from above, instead of being interposed between the left-side part 21L and the right-side part 21R. However, the point forming member 22 is interposed between the left-side part 21L and the right-side part 21R, such that the position of the point forming member 22 in the width direction can be determined with accuracy.

In the present embodiment, the point forming member 22 includes a triangular part with the main body 21 side as a base and the reference member 4 side as a vertex, and the vertex of the triangle is defined as the target point TP. Therefore, by aligning the target T with the vertex of the triangle, it is possible to install the target T to satisfy a predetermined condition for adjusting the equipment.

The pins 23, 24L, and 24R engage connection members 60L, 60R, 62L, and 62R, to be described later, in the connection unit 6 with the front bar member 2. More specifically, the pin 23 engages the connection members 62L and 62R, the pin 24L engages the connection member 60L, and the pin 24R engages the connection member 60R each with the front bar member 2. That is, the pins 23, 24L, and 24R are attachment members of the connection unit 6 on the front bar member 2 side. In the present embodiment, the pins 23, 24L, and 24R are provided to extend upward from a base portion 25 extending from the main body 21 to the reference member side. The base portion 25 is, for example, a metal plate, and can be fixed to the main body 21 by welding or the like.

In addition, in the present embodiment, the connection members 62L and 62R are engaged by the common pin 23 on the front bar member 2 side. Accordingly, a triangle is formed with pins 408L and 408R on the reference member 4 side and the pin 23. Therefore, in a case where the pins 408L and 408R, and the pin 24 are respectively connected by the connection members 62L and 62R, the position of the pin 23 is determined at one point. In addition, in the present embodiment, the pin 23 is provided on the extension line of the center line VC of the vehicle V. Accordingly, the distances from the pin 23 to the pins 408L and 408R on the reference member 4 side are equal to each other, such that the lengths of the connection members 62L and 62R can be made common.

<Reference Member>

Figure 4:
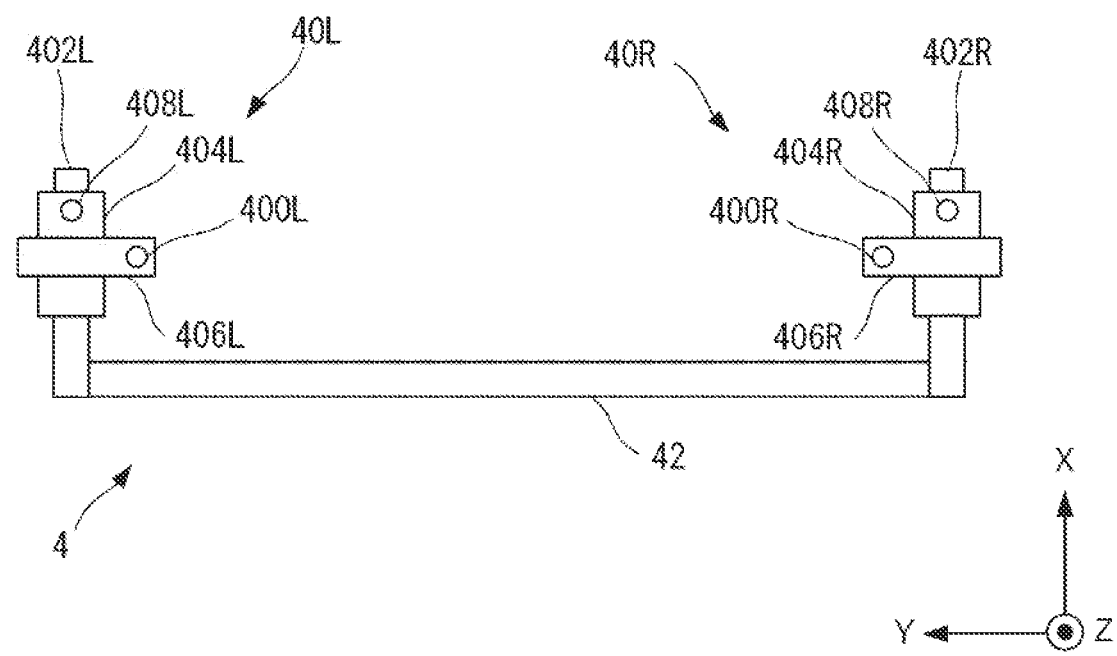
FIG. 4 is a plan view illustrating a configuration example of a reference member.
Figure 5A:
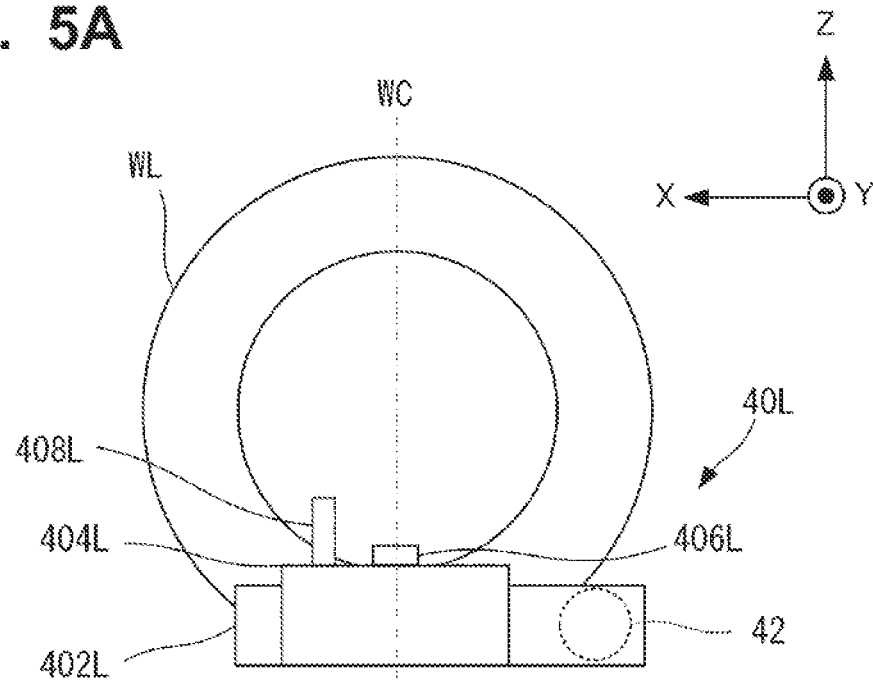
FIG. 5A is a view schematically illustrating a reference point forming unit 40L.
Figure 5B:
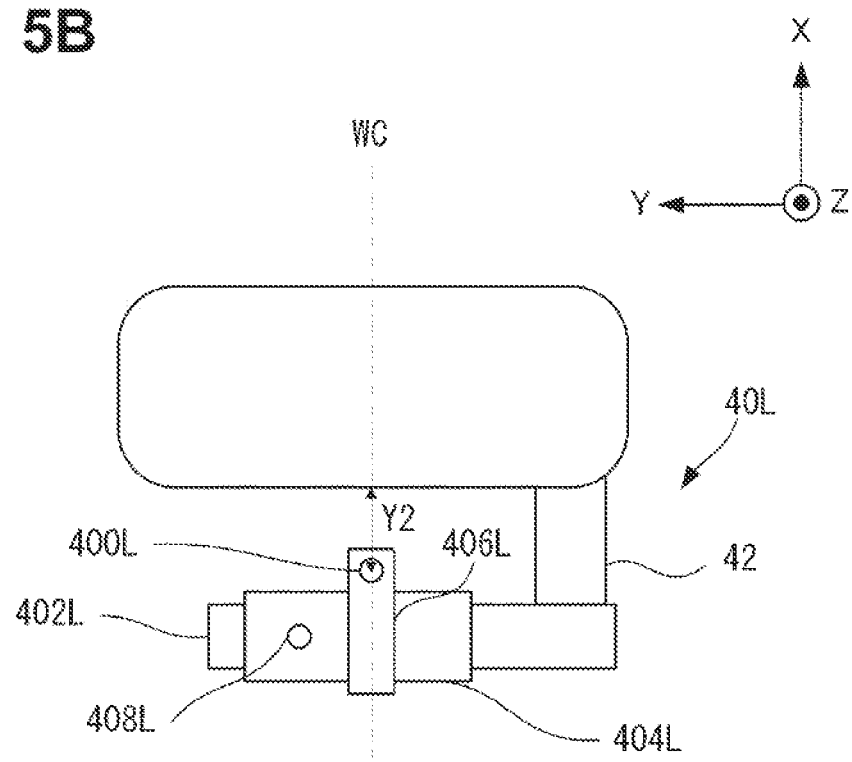
FIG. 5B is a view schematically illustrating the reference point forming unit 40L.

FIG. 4 is a plan view illustrating a configuration example of the reference member 4. In addition, FIGS. 5A and 5B are views schematically illustrating a reference point forming unit 40L, FIG. 5A is a left side view, and FIG. 5B is a plan view. Note that, in the following description, regarding the configuration that has been described for the reference point forming unit 40L, a reference point forming unit 40R can also have a corresponding configuration.

The reference member 4 is a member provided with the reference points 400L and 400R serving as references on the vehicle V side, when the distance between the vehicle V and the target point TP is determined. In the present embodiment, when the reference member 4 is arranged with respect to the vehicle V, the reference points 400L and 400R are respectively formed to be positioned on the left and right outer sides in the vehicle width direction of the vehicle V. The reference member 4 includes a set of reference point forming units 40L and 40R and a positioning unit 42.

In the reference point forming units 40L and 40R, the reference points 400L and 400R in the front-and-rear direction on the vehicle V side are formed. In the present embodiment, the wheel centers WC of the left and right tires WL and WR (front wheels) of the vehicle V are used as references in the front-and-rear direction. Therefore, the operator arranges the reference point forming units 40L and 40R such that the reference points 400L and 400R coincide with the wheel centers WC of the front wheels WL and WR in the front-and-rear direction. As a result, the distance in the front-and-rear direction from the wheel center WC of the left and right tires WL and WR (front wheels) to the target T can be set to a desired distance.

In addition, in the present embodiment, the reference point forming units 40L and 40R can adjust the left and right reference points 400L and 400R to be positioned on a line connecting the centers of the left and right tires WL and WR of the vehicle V and at an equal distance from the center line VC. As illustrated in FIGS. 5A and 5B, the reference point forming unit 40L includes a base portion 402L, a front-and-rear direction moving unit 404L movable in the front-and-rear direction with respect to the base portion 402L, and a vehicle width direction moving unit 406L movable in the vehicle width direction with respect to the front-and-rear direction moving unit 404L. In the present embodiment, since the reference point 400L is provided in the vehicle width direction moving unit 406L, the reference point 400L can be moved to a predetermined position on the XY plane by the movement of the front-and-rear direction moving unit 404L and the vehicle width direction moving unit 406L.

For example, the deviation of the reference point 400L from the wheel center WC can be adjusted by moving the front-and-rear direction moving unit 404L. In addition, for example, a scale is provided in the vehicle width direction moving unit 406L, and the centers of the vehicle V and the reference member 4 in the vehicle width direction can be aligned by matching the read values of the scales provided in the left and right vehicle width direction moving units 406L and 406R.

Note that, in the present embodiment, the common pin 408L for engaging the connection members 60L and 62L is provided on the front-and-rear direction moving unit 404L. Therefore, even when the front-and-rear direction moving unit 404L moves in the front-and-rear direction, the distance between the pin 408L and the reference point 400L in the front-and-rear direction is kept constant. Accordingly, the distance from the reference point 400L to the target point TP in the front-and-rear direction is also kept constant.

In the first embodiments, the front-and-rear direction moving unit 404L slides along the base portion 402L to move in the front-and-rear direction, and the vehicle width direction moving unit 406L slides along the front-and-rear direction moving unit 404L to move in the vehicle width direction. However, the reference point forming units 40L and 40R are not limited to the above configuration, and the positions of the reference points 400L and 400R can be adjustable in a known method. In addition, the reference point forming units 40L and 40R may include restriction mechanisms that restrict movements of the front-and-rear direction moving units 404L and 404R and the vehicle width direction moving units 406L and 406R, after the position adjustments with those units. Accordingly, it is possible to prevent the reference point from deviating after the adjustments.

The positioning unit 42 is a rod-shaped member provided to connect the left and right reference point forming units 40L and 40R. For example, the positioning unit 42 may be a metal pipe, and is connected to the base portions 402L and 402R at an end portion thereof.

The positioning unit 42 positions the reference point forming units 40L and 40R with respect to the vehicle V by abutting on the tires WL and WR of the vehicle V, from the side opposite, in the front-and-rear direction, to the side where the front bar member 2 is located, when the reference member 4 is arranged with respect to the vehicle V. Specifically, first, when the positioning unit 42 abuts on the tires WL and WR, the movement of the base portions 402L and 402R in the front-and-rear direction, particularly, the forward movement is restricted. Therefore, by determining the positions of the reference points 400L and 400R by the front-and-rear direction moving units 404L and 404R in this state, the reference point can be positioned more accurately.

The adjustment by the front-and-rear direction moving units 404L and 404R after the positioning by the positioning unit 42 may be performed, for example, by hanging a weight from the wheel center of the tire WL and making the position indicated by the weight coincide with the reference points 400L and 400R in the front-and-rear direction. In addition, the adjustment by the vehicle width direction moving units 406L and 406R may be performed by making distances Y2 of the reference points 400L and 400R from the wheels WL and WR coincide with each other to the left and right using a scale or the like.

<Connection Member>

Figure 6:
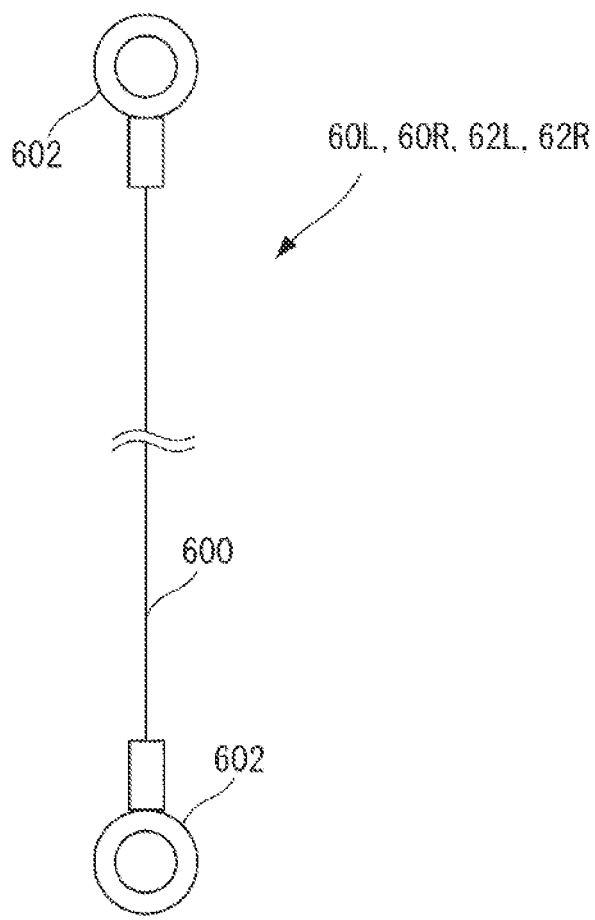
FIG. 6 is a view describing a configuration example of a connection member.

Reference is made to FIG. 6 together with FIG. 1. FIG. 6 is a view illustrating a configuration example of connection members 60L, 60R, 62L, and 62R. Hereinafter, regarding the configurations of the connection members 60L, 60R, 62L, and 62R, the connection member 60L will be given as an example, but the connection members 60R, 62L, and 62R each can have a similar configuration.

The connection unit 6 connects the front bar member 2 and the reference member 4 so that distances from the reference points 400L and 400R to the target point TP in the front-and-rear direction satisfy a predetermined condition. In the present embodiment, the connection unit 6 includes a set of connection members 60L and 60R and a set of connection members 62L and 62R that respectively connect the front bar member 2 and the reference member 4.

The connection member 60L includes a wire 600 and a fixing unit 602. The length of the wire 600 is set such that the distance from the reference point 400L to the target point TP in the front-and-rear direction satisfies a predetermined condition. In addition, the fixing unit 602 fixes the wire 600 to the front bar member 2 or the reference member 4. In the present embodiment, the fixing unit 602 has a ring shape engageable with the pin 24L. For example, the fixing unit 602 is formed of an elastic member such as resin or rubber. In addition, a fixing unit 602L may be attachable to and detachable from the wire 600L, or may be fixed by brazing or soldering.

In the present embodiment, when the reference member 4 is arranged with respect to the vehicle V, respectively on the left and right outer sides of the vehicle V, the connection members 60L and 60R extend in parallel with the center line VC of the vehicle V extending in the front-and-rear direction to connect the front bar member 2 and the reference member 4. In addition, when the reference member 4 is arranged with respect to the vehicle V, the connection members 62L and 62R respectively extend from the left and right outer sides of the vehicle V toward the center in the vehicle width direction to connect the front bar member 2 and the reference member 4. Note that the connection members 60L and 60R may respectively extend in the front-and-rear direction on the left and right outer sides of the vehicle V to connect the front bar member 2 and the reference member 4. A configuration in which the connection members 60L and 60R are not parallel to the center line VC of the vehicle V can also be adopted.

The lengths of the connection members 60L and 60R will be described. The target installation apparatus 1 is for installing the target T so that a distance X1 in the front-and-rear direction between the reference points 400L and 400R on the vehicle V side and the target T satisfies a predetermined condition. However, the reference points 400L and 400R and the target point TP, and the pins 408L and 408R, to which the connection members 60L and 60R are respectively attached, and the pins 24L and 24R are respectively offset in the front-and-rear direction. Accordingly, a length X2 (=a distance from the pins 408L and 408R respectively to the pins 24L and 24R) of the connection members 60L and 60R satisfies $$X2=X1+X3-X4 \quad \text{Expression (1).}$$

Here, X3 represents a distance from the target point TP to the pins 24L and 24R in the front-and-rear direction, and X4 represents a distance from the reference points 400L and 400R respectively to the pins 408L and 408R. As described above, a configuration in which the connection members 60L and 60R are not parallel to the center line VC of the vehicle V can also be adopted. However, by the connection members 60L and 60R being provided in parallel with the center line VC, it is possible to easily set the length corresponding to the distance between the reference points 400L and 400R and the target point TP based on Expression (1).

On the other hand, a length L1 of the connection members 62L and 62R can be calculated as follows, based on a length X2 of the connection members 60L and 60R and a distance Y3 in Y direction from the center line VC of the vehicle V to the pins 408L and 408R

$$L1=(X2^2+Y3^2)^{1/2} \quad \text{Expression (2).}$$

Here, it is also possible to specify the target point TP by connecting the front bar member 2 and the reference member 4 using the connection members 62L and 62R, without using the connection members 60L and 60R. However, in a case where the connection members 60L and 60R are not used, the front bar member 2 may rotate about the pin 23. This rotation causes a deviation of the position of the target point TP provided to be offset in X direction with respect to the pin 23, and the target T cannot be arranged with desired accuracy, in some cases. In addition, in a case where the target point TP is located at a position also offset from the center line VC of the vehicle V in the vehicle width direction (Y direction), the influence of the deviation of the target point TP caused by the rotation of the front bar member 2 will be increased.

In the present embodiment, by using the connection members 60L and 60R to be parallel to the center line VC and the connection members 62L and 62R extending from the vehicle outer sides to the center, it is possible to suppress the front bar member 2 from rotating around the pin 23 as a rotation axis. Specifically, relative positions of the pins 24L and 24R, spaced apart from the pin 23, to the reference member 4 are positioned by the connection members 62L and 62R, such that the rotation of the front bar member 2 around the pin 23 is suppressed. Therefore, the deviation of the target point TP can be reduced, and thus the accuracy of the position of the target point TP can be further improved.

Note that the demanded distance X1 from the reference point on the vehicle V side to the target point TP may vary depending on the type of the vehicle V or the type of the equipment to be adjusted. In such a case, the connection members 60L, 60R, 62L, and 62R each having a plurality of lengths may be prepared, and the connection members 60L, 60R, 62L, and 62R corresponding to the demanded distance X1 may be used. Accordingly, even in a case where the type of the vehicle V or the type of the equipment to be adjusted is different, it is possible to handle the difference by changing the connection members 60L, 60R, 62L, and 62R, and the front bar member 2 and the reference member 4 can be commonly used.

<Method of Using Target Installation Apparatus>

Next, an example of a method of using the target installation apparatus 1 will be described.

First, the operator inserts the reference member 4 into a bottom part of the vehicle V. Thereafter, the operator aligns the center of the reference member 4 in the width direction with the center of the vehicle V in the width direction using a scale or the like provided in the vehicle width direction moving units 406L and 406R.

Next, the operator connects the reference member 4 and the front bar member 2 using the connection members 60L and 60R. After that, the operator lightly pulls the front bar member 2 in a forward direction of the vehicle V to make the positioning unit 42 align and abut the tires WL and WR, and positions the reference member 4.

Next, the operator adjusts the position of the reference point on the vehicle V side by the front-and-rear direction moving units 404L and 404R.

Next, the operator connects the connection members 62L and 62R to the reference member 4 and the front bar member 2, places the front bar member 2 on the ground at a stable position by pulling the front bar member 2 in the forward direction of the vehicle V, and performs marking at a position corresponding to the target point TP.

Then, the operator installs the target T at the marked position.

As described above, according to the present embodiment, the front bar member 2 and the reference member 4 are connected by the connection members 60L and 60R respectively extending on the left and right outer sides of the vehicle V and the connection members 62L and 62R respectively extending from the left and right outer sides of the vehicle V to the center side of the vehicle V. Accordingly, the positioning accuracy of the target point TP can be further improved, and the workability at the time of installing the aiming target T can be improved. In addition, in the present embodiment, the front bar member 2 and the reference member 4 are connected by the connection unit 6 such that the distance in the front-and-rear direction from the reference point on the vehicle V side to the target point TP satisfies a predetermined condition. Therefore, it is no longer necessary to measure the distance between the front bar member 2 and the reference member 4 in the front-and-rear direction, and the operation time can be shortened.

Second Embodiment

Figure 7A:
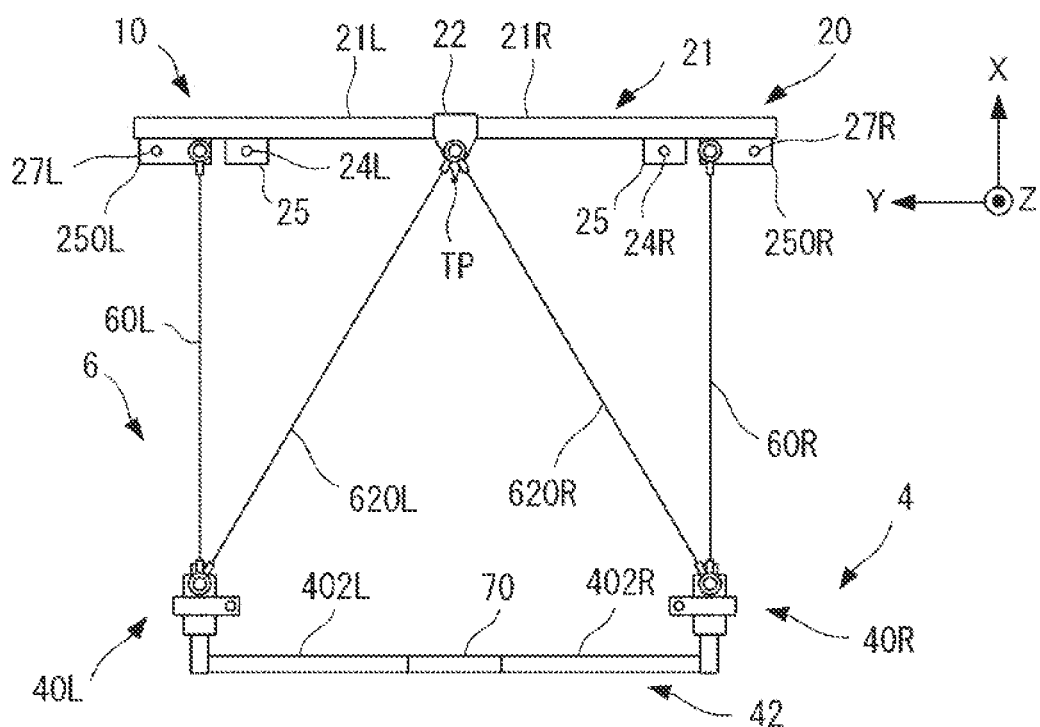
FIG. 7A is a plan view schematically illustrating a target installation apparatus according to a second embodiment.
Figure 7B:
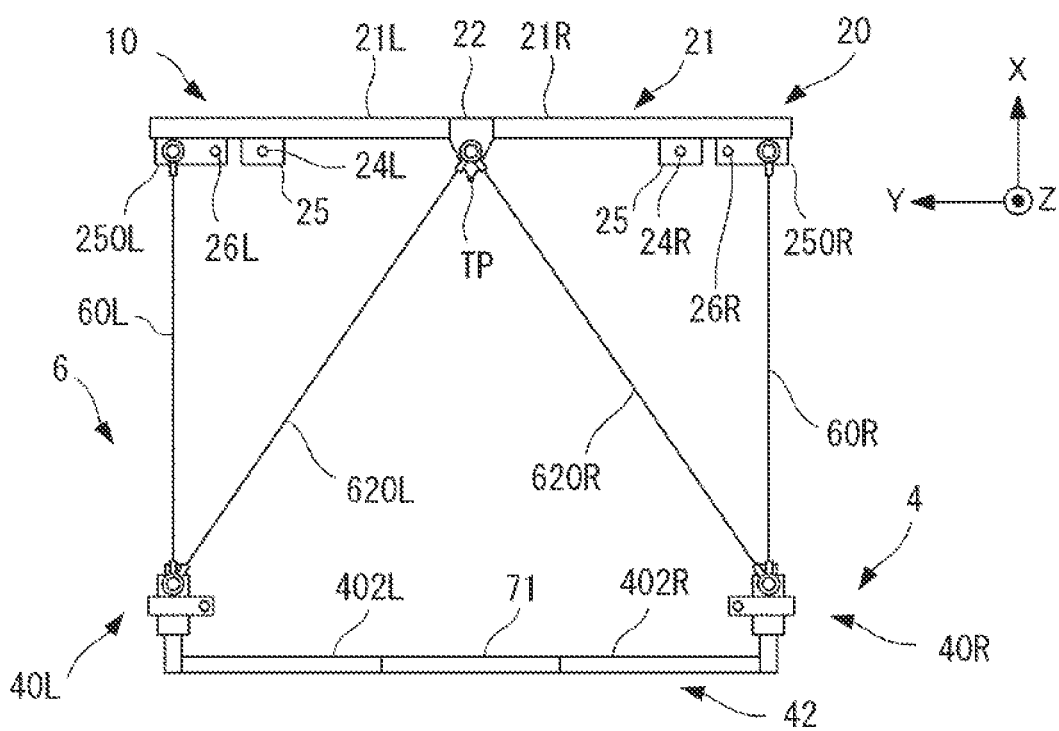
FIG. 7B is a plan view schematically illustrating a target installation apparatus according to the second embodiment.

Hereinafter, a target installation apparatus 10 according to a second embodiment will be described with reference to FIG. 7. FIGS. 7A and 7B are plan views schematically illustrating the target installation apparatus 10 according to the second embodiment. Note that the same components as those in the first embodiment are denoted by the same reference signs, and descriptions thereof will be omitted.

The target installation apparatus 10 according to the first embodiment can be used for the vehicle V having a vehicle width within a predetermined range by adjustment by the vehicle width direction moving units 406L and 406R. However, since the distance between the reference point forming units 40L and 40R is fixed, the target installation apparatus 1 may not be used when the vehicle width of the vehicle V is larger than this distance. The target installation apparatus 1 according to the second embodiment can also cope with vehicles V having a vehicle width in a wider range.

When the front bar member 20 is arranged with respect to the vehicle V, the front bar member 20 can be connected to the connection members 60L and 60R at a plurality of positions, which have different distances in the vehicle width direction from the center line VC, on each of the left and right sides of the vehicle V. Specifically, the front bar member 20 includes, on each of the left and right sides, the plurality of pins 24L and 24R, pins 26L and 26R, and pins 27L and 27R having different distances from the center line VC. The pins 26L and 27L are provided on a base portion 250L outside the base portion 25. The pins 26R and 27R are provided on a base portion 250R outside the base portion 25. As a result, the connection members 60L and 60R can be connected to the front bar member 20 at positions corresponding to the vehicle width of the vehicle V.

A positioning unit 420 is formed to be divisible into a left-side part 420L and a right-side part 420R, and can sandwich extending members 70 and 71 corresponding to the size in the vehicle width direction of the vehicle V, which is an aiming target. For example, when the positioning unit 420 is a metal pipe, the extending members 70 and 71 may be formed to be fitted to the inside of the pipe.

In the present embodiment, the distance between the pins 408L and 408R when the positioning member 420 sandwiches the extending member 70 corresponds to the distance between the pins 26L and 26R, and the distance between the pins 408L and 408R when the extending member 71 is sandwiched corresponds to the distance between the pins 27L and 27R. Specifically, the distance between the pins 408L and 408R when the positioning member 420 sandwiches the extending member 70 is equal to the distance between the pins 26L and 26R, and the distance between the pins 408L and 408R when the extending member 71 is sandwiched is equal to the distance between the pins 27L and 27R. Accordingly, the front bar member 20 and the reference member 400 can be connected by the connection members 60L and 60R in three stages of widths including a case where the extending members 70 and 71 are not used. In addition, the connection members 62L and 62R corresponding to the distance between the connection members 60L and 60R can be prepared.

As described above, in the present embodiment, the front bar member 20 and the reference member 400 can be connected by the connection members 60L and 60R with a plurality of widths. Therefore, the common target installation apparatus 10 can also be used for vehicles V having a wider range of vehicle widths.

Third Embodiment

Hereinafter, a target installation apparatus according to a third embodiment will be described with reference to FIG. 8. FIG. 8A is a plan view illustrating a configuration example of a front bar member 200 according to a third embodiment, and FIG. 8B is a plan view illustrating a configuration example of an extension member 7R. Note that the same components as those in the first embodiment are denoted by the same reference signs, and descriptions thereof will be omitted.

In the first embodiment, the case where the target point TP is provided on the front bar member 2 has been described as an example of the case where the aiming target T of the radar V1 arranged ahead of the vehicle and at the center in the vehicle width direction is installed. However, sensors such as radars may be arranged ahead of and on sides of the vehicle V. In such a case, the target point TP may be desired to be provided at a position inclined at a predetermined angle with respect to the front bar member 2. In the third embodiment, the extension members 7L and 7R for providing the target point TP at a position inclined at a predetermined angle with respect to the front bar member 2 are adopted. In the following description, regarding the configuration described for one of the extension members 7R and 7L, the other one may also have a corresponding configuration.

The extension members 7L and 7R can be attached to the front bar member 200 to extend at a predetermined angle with respect to the front bar member 200. As illustrated in FIG. 8B, the extension member 7R includes an attachment unit 71R, a rotation unit 72R, a rotation shaft member 73R, an angle scale 74R, and a scale 75R.

The attachment unit 71R is a part attached to the front bar member 200. For example, the attachment unit 71R can be fixed to the front bar member 200 by a fastening member 76R such as a bolt.

The rotation unit 72 rotates with respect to the attachment unit 71R with the rotation shaft member 73R as an axial center. As a result, the target point TP can be positioned at a desired angle with respect to the front bar member 200.

The angle scale 74R is a scale for confirming the rotation angle of the rotation unit 72. Since the designated angle of the rotation unit 72 may be different depending on the type of the vehicle V and the type of the equipment which is an aiming target, the operator reads the angle scale 74R and adjusts the rotation unit 72 to have the designated angle.

The scale 75R is for confirming the distance from the rotation shaft member 73R. For example, the designated distance from the rotation shaft member 73R can be set according to the type of the vehicle V and the type of the equipment which is an aiming target. Therefore, the operator reads the scale 75R and sets the designated distance from the rotation shaft member 73R as the target point TP.

As described above, according to the present embodiment, the target point TP can be positioned even when the target point TP is set at a predetermined distance and a predetermined angle from the front bar member 200.

Note that the configurations of the first embodiment and the third embodiment can be appropriately combined with each other.

Summary of Embodiments

The above embodiments disclose at least the following target installation apparatus.

A target installation apparatus (for example, 1) for installing an aiming target of equipment (for example, V1) mounted on a vehicle (for example, V), the apparatus comprising:
  a rod-shaped member (for example, 2) that is configured to be capable of being arranged to extend in a vehicle width direction of the vehicle ahead of or behind the vehicle, and is provided with a target point (for example, TP) indicating an installation position of the target; and
  a reference member (for example, 4) that is formed such that reference points (for example, 400L, 400R) are positioned on left and right outer sides in the vehicle width direction of the vehicle when the reference member is arranged with respect to the vehicle; and
  a connection unit (for example, 6) that connects the rod-shaped member and the reference member such that a distance from the reference point to the target point in the front-and-rear direction satisfies a predetermined condition, wherein
  the connection unit includes
    a set of first connection members (for example, 60L, 60R) that connect the rod-shaped member and the reference member on left and right outer sides of the vehicle when the reference member is arranged with respect to the vehicle, and a set of second connection members (for example, 62L, 62R) that extend from the left and right outer sides of the vehicle toward a center in the vehicle width direction to connect the rod-shaped member and the reference member when the reference member is arranged with respect to the vehicle.

According to this embodiment, the front bar member 2 and the reference member 4 are connected by the first connection member and the second connection member that extend on outer sides of the vehicle. Accordingly, the positioning accuracy of the target point TP can be further improved, and the workability at the time of installing the aiming target T can be improved. In addition, since the reference points are provided on the left and right outer sides in the vehicle width direction of the vehicle, the target installation apparatuses can also be used for vehicles having different vehicle widths.

2. According to the above embodiments,
the reference member includes
- a set of reference point forming units (for example, 40L, 40R) in which the reference points are formed, and
- a rod-shaped positioning unit (for example, 42) that is provided to connect a set of the reference point forming units and performs positioning of the reference point forming units with respect to the vehicle by abutting on a tire of the vehicle, from a side opposite to a side where the rod-shaped member is located, when the rod-shaped positioning unit is arranged with respect to the vehicle.

According to this embodiment, the reference member can be more reliably positioned in the front-and-rear direction.

3. According to the above embodiments,
the reference point forming units are adjustable to position a set of the reference points on a line connecting centers of left and right tires (for example, WL, WR) of the vehicle and at an equal distance from a center line extending in a front-and-rear direction of the vehicle.

According to this embodiment, the target can be positioned more accurately when the wheel center is set as the reference point.

4. According to the above embodiments, when the rod-shaped member is arranged with respect to the vehicle, the rod-shaped member is connectable to the first connection member at a plurality of positions (for example, 24, 26, 27) on each of left and right sides of the vehicle, the plurality of positions having different distances, in the vehicle width direction, from the center line extending in the front-and-rear direction of the vehicle.

According to this embodiment, the target can be installed according to the vehicle width of the vehicle.

5. According to the above embodiments, the positioning unit is formed in a divisible manner, and is capable of sandwiching an extending member (for example, 70, 71) corresponding to a size, in a vehicle width direction, of the vehicle which is an aiming target.

According to this embodiment, a target can be installed on vehicles having a wider range of vehicle widths.

6. According to the above embodiments, the first connection member and the second connection member include a wire.

According to this embodiment, when the rod-shaped member and the reference member are connected by the first connection member and the second connection member, the distance between the rod-shaped member and the reference member can be kept constant.

7. According to the above embodiments, the reference member includes common attachment units (for example, 408L, 408R), on left and right sides, to which the first connection member and the second connection member are attached.

According to this embodiment, components (pins) can be made common.

8. According to the above embodiments, the rod-shaped member includes a common attachment unit (for example, 23) to which, when the reference member is arranged with respect to the vehicle, the set of second connection members is attached on an extension line of a center line extending in the front-and-rear direction of the vehicle.

According to this embodiment, since a triangle is formed by the attachment unit on the reference member side and the attachment unit on the rod-shaped member side, the position of the attachment unit on the reference member side can be determined at one point when these are connected by the second connection member.

9. According to the above embodiments, an extension member (for example, 7L, 7R) extending at a predetermined angle with respect to the rod-shaped member is attachable to the rod-shaped member.

According to this embodiment, the target point can be positioned even when the target point is set at a predetermined distance and a predetermined angle from the rod-shaped member.

10. According to the above embodiments, each of a set of the first connection members extends in parallel with a center line extending in a front-and-rear direction of the vehicle to connect the rod-shaped member and the reference member.

According to this embodiment, the distance between the outer part of the front bar member and the reference point on the vehicle side can be adjusted more easily.

The invention is not limited to the foregoing embodiments, and various variations/changes are possible within the spirit of the invention.

What is claimed is:

1. A target installation apparatus for installing an aiming target of equipment mounted on a vehicle, the apparatus comprising:
- a rod-shaped member that is configured to be capable of being arranged to extend in a vehicle width direction of the vehicle ahead of or behind the vehicle, and is provided with a target point indicating an installation position of the target; and
- a reference member that is formed such that reference points are positioned on left and right outer sides in the vehicle width direction of the vehicle when the reference member is arranged with respect to the vehicle; and
- a connection unit that connects the rod-shaped member and the reference member such that a distance from the reference point to the target point in the front-and-rear direction satisfies a predetermined condition, wherein
the connection unit includes
- a set of first connection members that connect the rod-shaped member and the reference member on left and right outer sides of the vehicle when the reference member is arranged with respect to the vehicle, and
- a set of second connection members that extend from the left and right outer sides of the vehicle toward a center in the vehicle width direction to connect the rod-shaped member and the reference member when the reference member is arranged with respect to the vehicle.

2. The target installation apparatus according to claim 1, wherein
the reference member includes
a set of reference point forming units in which the reference points are formed, and
a rod-shaped positioning unit that is provided to connect a set of the reference point forming units and performs positioning of the reference point forming units with respect to the vehicle by abutting on a tire of the vehicle, from a side opposite to a side where the rod-shaped member is located, when the rod-shaped positioning unit is arranged with respect to the vehicle.

3. The target installation apparatus according to claim 2, wherein
the reference point forming units are adjustable to position a set of the reference points on a line connecting centers of left and right tires of the vehicle and at an equal distance from a center line extending in a front-and-rear direction of the vehicle.

4. The target installation apparatus according to claim 1, wherein, when the rod-shaped member is arranged with respect to the vehicle, the rod-shaped member is connectable to the first connection member at a plurality of positions on each of left and right sides of the vehicle, the plurality of positions having different distances, in the vehicle width direction, from the center line extending in the front-and-rear direction of the vehicle.

5. The target installation apparatus according to claim 2, wherein the positioning unit is formed in a divisible manner, and is capable of sandwiching an extending member corresponding to a size, in a vehicle width direction, of the vehicle which is an aiming target.

6. The target installation apparatus according to claim 1, wherein the first connection member and the second connection member include a wire.

7. The target installation apparatus according to claim 1, wherein the reference member includes common attachment units, on left and right sides, to which the first connection member and the second connection member are attached.

8. The target installation apparatus according to claim 1, wherein the rod-shaped member includes a common attachment unit to which, when the reference member is arranged with respect to the vehicle, the set of second connection members is attached on an extension line of a center line extending in the front-and-rear direction of the vehicle.

9. The target installation apparatus according to claim 1, wherein an extension member extending at a predetermined angle with respect to the rod-shaped member is attachable to the rod-shaped member.

10. The target installation apparatus according to claim 1, wherein each of a set of the first connection members extends in parallel with a center line extending in a front-and-rear direction of the vehicle to connect the rod-shaped member and the reference member.

\* \* \* \* \*